United States Patent
Packer

[19]

[11] Patent Number: 5,996,271
[45] Date of Patent: *Dec. 7, 1999

[54] BUOYANT FISHING LURE WITH FLUTTERING APPENDAGES

[76] Inventor: Raymond A. Packer, P.O. Box 924, Johnstown, Pa. 15907

[ * ] Notice: This patent issued on a continued prosecution application filed under 37 CFR 1.53(d), and is subject to the twenty year patent term provisions of 35 U.S.C. 154(a)(2).

[21] Appl. No.: 08/890,301

[22] Filed: Jul. 9, 1997

[51] Int. Cl.[6] .................................................. A01K 85/00
[52] U.S. Cl. ...................... 43/42.24; 43/42.06; 43/42.26
[58] Field of Search ............... 43/42.06, 42.24, 43/42.26, 42.28, 42.3; D22/132

[56] References Cited

U.S. PATENT DOCUMENTS

| D. 239,447 | 4/1976 | Radcliff | 43/42.26 |
|---|---|---|---|
| 2,785,497 | 3/1957 | Berry | 43/42.26 |
| 3,105,317 | 10/1963 | Fox . | |
| 4,214,397 | 7/1980 | Kent . | |
| 4,267,658 | 5/1981 | Brown | 43/42.06 |
| 4,885,867 | 12/1989 | Leal | 43/42.24 |
| 4,993,183 | 2/1991 | Carver | 43/42.24 |
| 5,009,024 | 4/1991 | Parman | 43/42.24 |
| 5,142,811 | 9/1992 | Freeman | 43/42.06 |
| 5,265,368 | 11/1993 | Taylor | 43/42.06 |
| 5,517,781 | 5/1996 | Paoletta | 43/42.06 |
| 5,725,892 | 3/1998 | Gibbs | 43/42.06 |

*Primary Examiner*—Kurt Rowan
*Attorney, Agent, or Firm*—Laubscher & Laubscher

[57] ABSTRACT

A fishing lure in the general shape of a salamander includes a head portion, a tapered neck portion, a body portion, a pair of front legs, a pair of rear legs, and a tail portion. The lure contains a hollow interior chamber which provides buoyancy and communicates with a hole through which air bubbles are allowed to escape, thereby providing sensory enticement to fish. Each leg and the tail portion include a thin flat portion which moves in a lifelike oscillating fashion when excited by water flowing past the lure, thereby providing additional sensory enticement to fish.

1 Claim, 1 Drawing Sheet

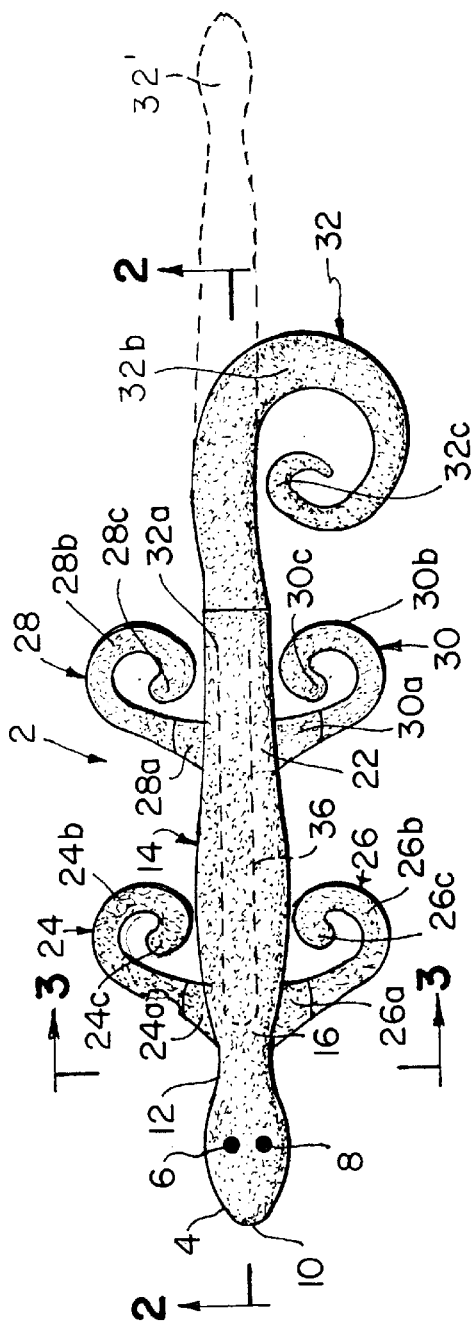
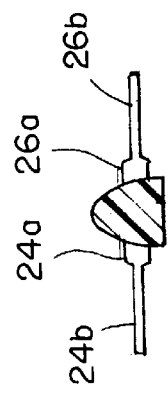
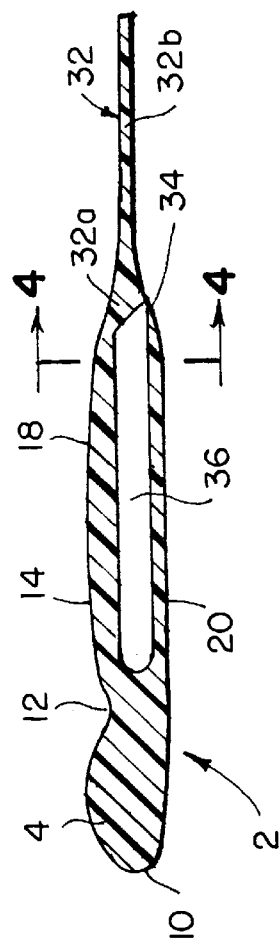
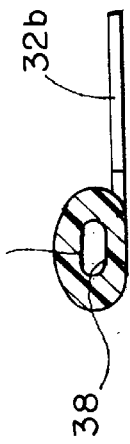

BUOYANT FISHING LURE WITH FLUTTERING APPENDAGES

BACKGROUND OF THE INVENTION

The present invention relates to fishing lures and, more particularly, to a lifelike fishing lure in the shape of a salamander having appendages which flutter when acted on by water. The lure also contains an internal chamber which increases the flexibility and buoyancy of the lure and further generates air bubbles, thereby giving the lure more lifelike characteristics.

BRIEF DESCRIPTION OF THE PRIOR ART

Various fishing lure devices are known in the patented prior art. The U.S. Pat. No. 3,105,317 to Fox, for example, discloses numerous highly complex fishing lures in the shapes of a crayfish, a tadpole, a frog, a shrimp, and a worm. Each lure uses a gas generating tablet deposited within the lure to impart movement to the appendages of the lure. To accomplish this, each lure is constructed with a hollow internal chamber to permit the deposit of the tablet within the lure, and an array of ducts and passages within each of the appendages which allow the gas to escape and vibrate the appendages, thereby giving the appearance of movement to the lure.

The U.S. Pat. No. 4,214,397 to Kent discloses a fishing worm lure having a hollow tubular central portion and a flexible tail portion including a plurality of tail segments. Movement of the lure through water causes the tail segments to gyrate, thereby producing visual stimulus to fish and developing turbulence in the water. Neither of these devices, however, disclose a lifelike fishing lure which is easy to produce and use.

The present invention was developed to overcome these and other drawbacks of the prior devices by providing an improved fishing lure formed in the shape of a salamander or lizard including a head portion and a body portion having a plurality of appendages extending therefrom. More particularly, the lure including a plurality of leg portions and a tail portion each of which include a relatively thin, flat, flexible portion which flutters when the lure moves through water. In addition, the lure contains a hollow chamber which extends through the body portion and part of the tail portion and communicates with a hole contained in the lower rear surface area of the body portion. The chamber provides buoyancy, increases the flexibility of the lure, and allows air bubbles to escape, thereby creating sensory enticement for fish.

SUMMARY OF THE INVENTION

Accordingly, a primary object of the present invention is to provide a lifelike fishing lure in the shape of a salamander having a plurality of appendages which flutter when water flows past them and further having a hollow interior chamber which increases the buoyancy of the lure, increases its flexibility, and provides air which is allowed to escape and form bubbles which create sensory enticement for fish.

It is a more specific object of the invention to provide a fishing lure having a head portion, a narrow neck portion, a body portion, a pair of front legs, a pair of hind legs, a tail portion, and a hollow interior chamber. Each of the legs and the tail include a flat curled portion which is highly flexible and easily put into motion by water flowing past the lure.

It is another object of the invention to provide a fishing lure having a pair of projections arranged of the head portion to represent eyes and shoulders for joining the highly flexible flat portions of each leg with the body portion of the lure.

It is a further object of the present invention to provide a fishing lure which is inexpensive to produce and easy to use.

BRIEF DESCRIPTION OF THE DRAWINGS

Other objects and advantages of the invention will become apparent from a study of the following specification when viewed in light of the accompanying drawings, in which:

FIG. 1 is a top plan view of the fishing lure according to the invention;

FIG. 2 is a sectional view taken along line 2—2 of FIG. 1;

FIG. 3 is a sectional view taken along line 3—3 of FIG. 1; and

FIG. 4 is a sectional view taken along line 4—4 of FIG. 2.

DETAILED DESCRIPTION

Referring first to FIGS. 1–4, there is shown a fishing lure 2 in the form of a salamander or lizard. The lure is formed integrally from a single piece of a suitable yielding synthetic material. The lure includes a football shaped head portion 4 having a pair of projections 6,8 arranged on its top surface which represent the eyes of the salamander. The head portion 4 is solid to allow a fishing hook (not shown) to be inserted therein. The head portion 4 includes a cone-shaped nose 10 which defines the forward end of the lure. An hourglass shaped neck portion 12 is joined with and extends from the head portion 4. The narrow neck portion 12 allows the head portion 4 to pivot and thereby closely simulate the movement of a live salamander.

A longitudinal body portion 14 having a forward end 16, a top back surface 18, a bottom belly surface 20, and a rear end 22 is joined with the neck portion 12. A pair of forward legs 24,26 extend generally outwardly from the forward end 16 of the body portion and a pair of rear or hind legs 28,30 extend generally outwardly from the rear end 22 of the body portion. Each leg 24,26,28,30 includes a built-up shoulder portion 24a,26a,28a,30a, respectively, adjacent the body portion 14 which provides the lure with a more lifelike appearance and also provides added strength for the connection of each leg with the body. Each leg further includes a flat relatively thin fin-like portion 24b,26b,28b,30b which extends outwardly from its respective shoulder portion to form a curl. Each fin portion 24b,26b,28b,30b is constructed to produce a fluttering or swimming motion when water flows past the lure as may occur when the lure is pulled through the water by a fisherman or when the lure is stationary in the water, such as when the lure is resting on the bottom, and the water current carries water past the lure. Accordingly, each fin portion must be thin enough to produce the necessary degree of flexibility to allow each fin to oscillate when acted on by water. In addition, each fin portion 24b,26b,28b, 30b includes a flared or widened terminal end portion 24c,26c,28c,30c. The widened terminal end portion serves to enhance the swimming or fluttering movement of each fin when water flows past the lure.

A tail portion 32 extends rearwardly from the body portion 14 and defines the rear end of the lure. The tail portion includes a first portion 32a which extends from the rear end 22 of the body portion 14 adjacent the rear legs 28,30 and a flat relatively thin end portion 32b which extends rearwardly from the first portion 32a in the form of a curl. To maximize the sensor effect of the tail portion 32 (as shown in phantom in FIG. 1), the overall straightened length of the tail portion 32 is greater than the combined length of the head portion 4, neck portion 12, and body portion 14. A hole or port 34 (FIG. 2) is contained within the bottom surface of the tail portion 32 where the first tail portion 32a and end tail portion 32b are joined. The tail end portion 32b, like each leg, includes a flared terminal end portion 32c which serves to increase the fluttering action of tail as the lure is moved through the water.

A longitudinal chamber 36 contained within the lure extends from the forward end 16 of the body portion 14, through the first portion 32a of the tail and angles downwardly to communicate with hole 34. The chamber has a smooth interior surface 38 and has generally constant cross-sectional area. The chamber is angled downwardly toward the hole 34 to allow the flat end portion 32b of the tail to be joined with the first portion 32a and provide material of sufficient thickness to provide structural integrity to the connection.

The chamber 36 produces a body portion 14 formed from a relatively thin wall of material rather than from a solid piece of material. This serves to increase the flexibility of the body portion and thereby allows the movement of a live piece of bait to be more closely simulated. The chamber also increases the buoyancy of the lure so that the lure can rest on the bottom or float in the water depending on the weight of the rig attached. In addition, if the rig attached to the lure is heavy enough to cause the lure to rest on the bottom, the chamber will cause the body portion 14 to pivot upwardly and float relative to the head portion 4. Thus, even if the lure sinks to the bottom, the legs and tail portion of the lure will float and will therefore be able to flutter and attract fish. The chamber also provides air which is permitted to escape through hole 34 in the form of bubbles which serve to attract fish.

It will be recognized that the lure may be made in various colors, may be provided with flake or glitter to further increase its sensory effect on fish, and may be fabricated in the form of other types of bait, such as, for example, other fish or a frog.

While in accordance with the provisions of the Patent Statutes the preferred forms and embodiments of the invention have been illustrated and described, it will be apparent to those of ordinary skill in the art that various changes and modifications may be made without deviating from the inventive concepts set forth above.

What is claimed is:

1. A generally salamander-shaped fishing lure, comprising:

(a) a unitary elongated horizontal body portion (14) formed from flexible synthetic plastic material, said body portion having a given thickness;

(b) a solid head portion (4) connected with the forward end of said body portion by a relatively narrow hourglass-shaped neck portion (12);

(c) a flexible tail portion (32) connected with the rearward end of said body portion, said tail portion having at its free rear extremity a body portion, said tail portion having at its free rear extremity a curled flat intermediate portion (32b), said flat tail intermediate portion being connected at its forward end with said body portion by a tapered connecting portion (32a) of progressively increasing thickness; and (d) a plurality of flexible appendages (24, 26, 28, 30) connected in longitudinally spaced relation on opposite sides of mid-body portion, each of said appendages including a curled intermediate flat fin portion (24b; 26b; 28b; 30b) that is connected with said body portion by a tapered connecting shoulder portion (24a; 26a; 28a; 30a) of progressively increasing thickness;

(e) said body section and the adjacent end of said tapered tail portion containing a longitudinal air chamber (36) provided at its rear end with an access opening including a port (34) contained in a bottom surface of said tapered connecting portion;

(f) said tail flat portion and said intermediate flat fin portions each including flared terminal extremities (32c; 24c; 26c; 28c; 28d) which serve to increase the fluttering action of the tail and fin portions;

(g) said longitudinal chamber having a generally uniform cross-section throughout its length and terminating at its rear end in a downwardly angled convergent portion that communicates with said port, thereby to provide a rear end of said body portion with sufficient structural integrity for connection with said tapered connecting.

* * * * *